US008535156B2

(12) United States Patent
Roireau

(10) Patent No.: US 8,535,156 B2
(45) Date of Patent: *Sep. 17, 2013

(54) GAMING SYSTEM AND METHOD FOR PROVIDING A BONUS GAME WITH A CHOICE BY ANOTHER PLAYER(S)

(75) Inventor: Alan Roireau, Aroda, VA (US)

(73) Assignee: Video Gaming Technologies, Inc., Franklin, TN (US)

(*) Notice: Subject to any disclaimer, the term of this patent is extended or adjusted under 35 U.S.C. 154(b) by 1663 days.

This patent is subject to a terminal disclaimer.

(21) Appl. No.: 11/277,094

(22) Filed: Mar. 21, 2006

(65) Prior Publication Data

US 2006/0217171 A1 Sep. 28, 2006

Related U.S. Application Data

(60) Provisional application No. 60/665,044, filed on Mar. 24, 2005.

(51) Int. Cl.
*A63F 13/00* (2006.01)

(52) U.S. Cl.
USPC .................... 463/42; 463/25; 463/26; 463/27

(58) Field of Classification Search
USPC ................................................ 463/25–27, 42
See application file for complete search history.

(56) References Cited

U.S. PATENT DOCUMENTS

| | | | | |
|---|---|---|---|---|
| 5,046,736 | A | 9/1991 | Bridgeman et al. | |
| 5,564,700 | A * | 10/1996 | Celona | 463/27 |
| 5,935,002 | A | 8/1999 | Falciglia | |
| 5,971,849 | A | 10/1999 | Falciglia | |
| 6,077,162 | A | 6/2000 | Weiss | |
| 6,093,101 | A | 7/2000 | Mourad | |
| 6,142,872 | A | 11/2000 | Walker et al. | |
| 6,213,876 | B1 | 4/2001 | Moore, Jr. | |
| 6,240,415 | B1 * | 5/2001 | Blumberg | 707/9 |
| 6,312,332 | B1 | 11/2001 | Walker et al. | |
| 6,319,122 | B1 | 11/2001 | Packes, Jr. et al. | |
| 6,361,441 | B1 | 3/2002 | Walker et al. | |
| 6,364,765 | B1 | 4/2002 | Walker et al. | |
| 6,368,218 | B2 | 4/2002 | Angell, Jr. | |
| 6,503,146 | B2 | 1/2003 | Walker et al. | |
| 6,575,831 | B1 | 6/2003 | Gonen et al. | |
| 6,605,001 | B1 | 8/2003 | Tarantino | |
| 6,634,946 | B1 | 10/2003 | Bridgeman et al. | |
| 6,652,378 | B2 | 11/2003 | Cannon et al. | |
| 6,656,047 | B1 | 12/2003 | Tarantino et al. | |

(Continued)

*Primary Examiner* — Dmitry Suhol
*Assistant Examiner* — David Duffy
(74) *Attorney, Agent, or Firm* — Howard & Howard Attorneys PLLC

(57) ABSTRACT

A gaming system having a plurality of game devices, a game controller and a shared experience controller and a method for operation thereof is disclosed. Each game device allows a player to make a wager on a game and awards the respective player an award as a function as a result of a winning condition for the game played by the respective player. The game controller is coupled to the game devices for playing the game, randomly establishing the actual outcome of the game, and determining if any of the players have a winning condition. The shared experience controller is coupled to the game devices for recognizing a bonus condition for one of the players, responsively providing a choice of items to one or more other players, and providing a bonus award to the one player and/or any of the other players in response to selection of on of the items.

32 Claims, 4 Drawing Sheets

(56) References Cited

U.S. PATENT DOCUMENTS

| | | | | |
|---|---|---|---|---|
| 6,692,353 | B2 | 2/2004 | Walker et al. | |
| 6,702,671 | B2 | 3/2004 | Tarantino | |
| 6,712,699 | B2 | 3/2004 | Walker et al. | |
| 6,733,390 | B2 | 5/2004 | Walker et al. | |
| 6,764,397 | B1 | 7/2004 | Robb | |
| 6,773,345 | B2 | 8/2004 | Walker et al. | |
| 6,811,482 | B2 | 11/2004 | Letovsky | |
| 6,869,361 | B2 * | 3/2005 | Sharpless et al. | 463/25 |
| 6,887,154 | B1 * | 5/2005 | Luciano et al. | 463/26 |
| 2001/0034264 | A1 | 10/2001 | Berman et al. | |
| 2002/0039923 | A1 | 4/2002 | Cannon et al. | |
| 2003/0114218 | A1 | 6/2003 | McClintic | |
| 2003/0119579 | A1 | 6/2003 | Walker et al. | |
| 2003/0160387 | A1 | 8/2003 | Drury | |
| 2003/0224852 | A1 | 12/2003 | Walker et al. | |
| 2004/0087370 | A1 | 5/2004 | Tarantino | |
| 2004/0106446 | A1 | 6/2004 | Cannon et al. | |
| 2004/0132524 | A1 | 7/2004 | Ramstad et al. | |
| 2004/0142741 | A1 | 7/2004 | Walker et al. | |
| 2004/0162130 | A1 | 8/2004 | Walker et al. | |
| 2004/0162144 | A1 | 8/2004 | Loose et al. | |
| 2004/0166929 | A1 | 8/2004 | Tarantino | |
| 2004/0192430 | A1 | 9/2004 | Burak et al. | |
| 2004/0204235 | A1 | 10/2004 | Walker et al. | |

* cited by examiner

GAMING SYSTEM AND METHOD FOR PROVIDING A BONUS GAME WITH A CHOICE BY ANOTHER PLAYER(S)

RELATED APPLICATIONS

The present invention claims priority to U.S. Provisional Patent Application Ser. No. 60/665,044, filed Mar. 24, 2005, which is hereby incorporated by reference in its entirety. U.S. patent application Ser. Nos. 11/277,091 and 11/277,099, also claim priority to U.S. Provisional Patent Application Ser. No. 60/665,044, and are hereby incorporated by reference.

FIELD OF THE INVENTION

The present invention relates generally to electronic games, and more particularly, to a system and method which provides an award for a base game to a player of an electronic game and a bonus award to one or more players in response to input from the players.

BACKGROUND OF THE INVENTION

Games upon which players may make wagers and win awards based on the outcome of the game have been generally known for a long time.

More recently, in order to increase player excitement and the likelihood that a player will remain at a game longer, electronic games have been linked to together to provide a progressive jackpot award. In such systems, a portion of each wager made by the players is generally added to the progressive jackpot. The progressive jackpot is typically displayed in order to generate excitement in the players as the jackpot grows.

However, this presents several problems. First, as players become more and more accustomed to "large" progressive jackpots, they may become jaded. Thus, the level of excitement may be minimum until the progressive jackpot becomes large.

Second, generally progressive jackpots are awarded when a player generates a predetermined or preset condition within the main game. Thus, there is no building of excitement between the players based on each others' play. In other words, with a typical progressive jackpot, there is no shared excitement which is generated when another player wins because it has no positive effect for the other players.

Another type of award or jackpot is a bonus award. Typically, the bonus award is presented as an award for winning or playing a bonus game. The bonus game is usually triggered by some predetermined event within the main game. The bonus game may be as simple as allowing the player to make a choice between three items. Each item may be "hiding" or representing the award amount. The bonus game may be a pseudo game. In other words, the amount of the award is predetermined and the choice made by the player does not affect the actual award amount.

However, this type of award only involves the player who triggers the bonus game, plays the bonus game and receives the bonus award. Thus, again, it generates no shared excitement.

The present invention is aimed at one or more of the problems identified above.

SUMMARY OF THE INVENTION

In a first aspect of the present invention a gaming system having a plurality of game devices, a game controller and a shared experience controller is provided. Each game device allows a player to make a wager on a game and awards the respective player an award as a function as a result of a winning condition for the game played by the respective player. The game controller is coupled to the game devices for playing the game, randomly establishing the actual outcome of the game, and determining if any of the players have a winning condition. The shared experience controller is coupled to the game devices for recognizing a bonus condition for one of the players, responsively providing a choice between at least two items to at least one other player, and providing a bonus award to the one player and/or any of the other players in response to the at least one other player selecting one of the items.

In a second aspect of the present invention, a method for providing a shared experience for players of a plurality of game devices is provided. Each game device allows a player to make a wager on a game. The method includes the steps of playing a game and establishing an actual outcome of the game, determining if one of the players has a winning condition as a function of the actual outcome, and awarding a main award to the one of the players if the winning condition is met. The method also includes the steps of recognizing a bonus condition for one of the players, presenting a choice between at least two items to at least one other player, and providing a bonus award to the one player and/or any of the other players in response to the at least one other player selecting one of the items.

In a third aspect of the present invention, a gaming system for a plurality of players having a plurality of game devices, a game controller and a shared experience controller is provided. The game devices allow the players to make a wager on a game and awarding the respective player an award as a function as a result of a winning condition for the game played by the respective player. The game controller is coupled to the game devices for playing the game, randomly establishing the actual outcome of the game, and determining if any of the players have a winning condition. The shared experience controller is coupled to the game devices for establishing for at least two teams. Each team includes at least two players. The shared experience recognizes a bonus condition for one of the players on a first one of the teams, presents a choice of items to at least one other player on the first team or another team, and responsively provides a bonus award to the one player and/or any of the other players in response to the at least one other player making a selection between the items.

In a fourth aspect of the present invention, a method for providing a shared experience for players of a plurality of game devices is provided. Each game device allows a player to make a wager on a game. The method includes the step of establishing at least two teams. Each team includes at least two players. The method further includes the steps of playing a game and establishing an actual outcome of the game, determining if one of the players has a winning condition as a function of the actual outcome, and awarding a main award to the one of the players if the winning condition is met. The method also includes the steps of recognizing a bonus condition for one of the players on a first one of the teams, presenting a choice of items to at least one other player on the first team or another team, and responsively providing a bonus award to the one player and/or any of the other players in response to the at least one other player making a selection between the items.

BRIEF DESCRIPTION OF THE DRAWINGS

The present invention will now be described, by way of example, with reference to the appended description, claims and drawings, wherein:

DETAILED DESCRIPTION OF THE INVENTION

With reference to the drawings and in operation, the present invention provides a game system 10 for playing an electronic game.

Figure 1:
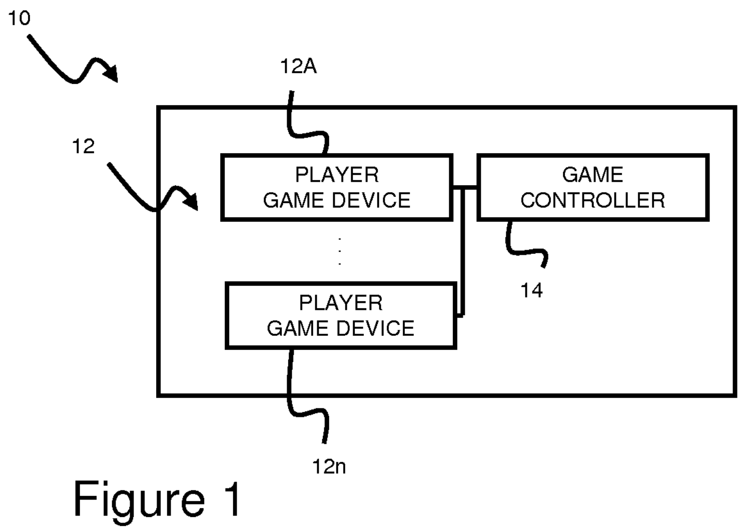
FIG. 1 is a block diagram of a game system for providing a shared win among players of an electronic game, according to an embodiment of the present invention.
Figure 2:
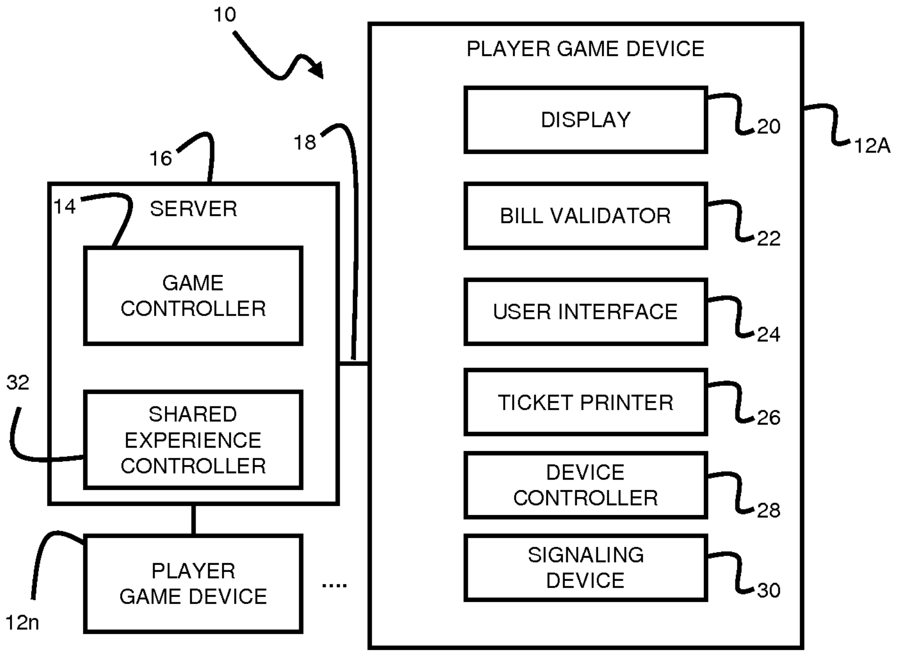
FIG. 2 is a block diagram of a game system for providing a shared win among players of an electronic game, according to another embodiment of the present invention.

With particular reference to FIGS. 1 and 2, the game system 10 includes a plurality of player game devices 12 and a game controller 14. For example, the system 10 may include n game devices 12A-12*n*. The player game device 12 allows a player to place a wager on a game.

In one embodiment, each game device 12 includes a game controller 14. Each game controller 14 may independently run a game for the game device 12.

For example, the game devices may be video slot machines, as is known in the art. Each video slot machine includes a game controller 14 which independently runs games on the machine.

In another embodiment, the game controller 14 is embodied in a remote computer, such as a server 16 (see FIG. 2). The game controller 14 runs the games which are operable on the game devices 12.

For example, in some jurisdictions or for certain facilities, wagering is permitted on only certain types of games, e.g., Bingo. In these jurisdictions, the players may compete against each other in the electronic game. The Bingo game may be run on the central server, however, each player interfaces with the game through a game device 12. Furthermore, although the base game is a Bingo game, the game devices 12 may present an interface or face on top of the Bingo game which mimics, simulates, or appears as another type of game.

For example, U.S. patent application Ser. No. 10/797,338, filed Mar. 10, 2004, which is hereby incorporated by reference, and is currently assigned to the assignee of the present application, discloses a gaming system which plays a bingo game and then displays a representation of the result through a mechanical technological aid.

U.S. patent application Ser. No. 10/938,490. filed Sep. 10, 2004 and U.S. patent application Ser. No. 10/939,489 filed Sep. 10, 2004 both of which are incorporated by reference, disclose gaming systems which show the results of an electronic game by simulating a blackjack game and a Keno game, respectively.

The game controller 14 is coupled to the player game device 12 for playing the electronic game and establishing an outcome of the electronic game. Typically, the outcome of the electronic game includes a payout or award according to a first pay table if a winning condition has been achieved.

The electronic game may be any type of game which has an outcome and provides a payout. For example, the type of electronic game may include, but is not limited to, bingo and similar games, slot machines, casino games, card games, dog or horse racing, lotteries, and all other forms of gaming. For purposes of illustration only, the present invention is described below in terms of a bingo game which is run by a game controller implemented on a server computer, but the present invention is not limited to such.

With particular reference to FIG. 2 in one embodiment, a plurality of player game devices 12 connected to a server 16 are provided. The game controller 14 is implemented by the server 16. Each player device 12 may be connected to the server 16 by an Ethernet link 18.

The player game device 12 allows a player to place a wager and purchase an electronic bingo card 20. In one embodiment, the electronic bingo card is a 5×5 grid with the columns labeled B, I, N, G, and O, respectively. The center cell may be a “free” cell.

Each Bingo game has at least one winning pattern. A winning pattern is a sub-set of the cells of the grid which trigger an award or payout. The amount of the award or payout may be dependent upon the wager made by the player and a predetermined pay table. In one embodiment, each Bingo game has a game-ending pattern which signifies the end of the game. For example, the game-ending pattern may include all of the cells of the electronic bingo card 20. The payout associated with the game-ending pattern is paid to the first player who achieves the game-ending pattern.

One or more interim winning patterns may also be included. The interim winning patterns may provide a payout, without ending the game, as a function of the player’s wager and a second pay table. The interim winning patterns may have other conditions associated therewith. For example, in order for a payout to occur, the interim winning pattern must be achieved within a predetermined number of the randomly drawn numbers.

The game controller 14 is coupled to the player game device 12 and establishes a set of chosen numbers. In one embodiment, the set of chosen numbers are randomly chosen using a random number generator (not shown).

In one embodiment, there are a predetermined number of numbers in the set of chosen numbers, e.g., seventy-five.

In one embodiment, the predetermined number of numbers in the set of chosen numbers are established within a predetermined period of time, e.g., approximately 10 seconds.

The game controller 14 compares the set of randomly chosen numbers with the associated winning pattern and establishes an outcome of the electronic bingo game. The outcome of the electronic bingo game may include a payout according to a first pay table if the winning pattern has been achieved. The winning pattern may be the game ending pattern and/or one or more interim winning patterns. In other words, the outcome of the electronic bingo game may include a payout to the player if the game ending pattern is achieved and, alternatively or in addition, may include a second payout if an interim winning pattern is achieved.

The outcome of the electronic bingo game may be a “loss” if no winning pattern is achieved after all numbers have been selected or another player achieves the game winning pattern.

After the Bingo game has been played, the game controller 14 may simulate another type of game on the player game device 12.

With specific reference to FIG. 2, the player game device 12 may be a stand-alone device, console or upright machine which is connected to the server 16 via, for example, an Ethernet link. In one embodiment, the player game device 12 includes a display device 20, a bill validator 22, a user interface 24, a ticket printer 26, a device controller 28, and a signaling device.

To initiate the play of the game, a player inserts credits or coins, or currency into the player game device 12. Coins may be inserted into a coin acceptor (not shown) if provided. Currency may be inserted into a bill validator 22. The coins or currency may be converted into credits. Alternatively or in addition, the player may insert a ticket or card having a number of credits represented thereon or may insert a player tracking card to access credits in a player account.

The user interface device 24 allows interaction between the player game device 12, the game controller 14, and the player. The user interface device 24 may include the display 20 and a plurality of buttons. In one embodiment, the user interface device 24 is a touch-screen device. User input buttons are implemented by the touch screen. Alternatively, or in addition, other input buttons may be implemented by mechanical push-buttons. The number of credits or currency input by the player are added to a credit meter and displayed on the display screen 20.

The user interface device 24 may also provide a menu button. The player may access additional functions via the menu button. For example, the menu button provides the player with an opportunity, through a menu item, to cash out. In one embodiment, in response to the player choosing to cash out, a ticket representing the remaining credits on the credit meter is printed by the ticket printer 26. The printed ticket may be redeemed for cash at a kiosk or cashier station.

The bill validator 22, the user interface device 24, and the ticket printer 26 are coupled to and controlled by the device controller 28. The device controller 28 also manages communications to and from the server 16.

Although the game devices 12 have been described as providing a Bingo based main game through the server 16, this is for exemplary purposes only. The present invention is not limited to any specific type of main game nor to a game which is run by a remote server.

In one aspect of the present invention, the system 10 provides a shared experience for the players. In one embodiment, as shown in FIG. 2, the system 10 includes a shared experience controller 32, which may be implemented by the server 16 or by another computer or by one of the device controllers 28 in one of the game devices 12.

As discussed above, the system 10 allows players to make wagers on a game through the game devices 12. The game may be run by the game controller 14. The game controller 14 may be implemented in the device controller 28 on each game device 12 or by a remote computer, such as the server 16.

Each game device 12 allows a player to make a wager on a game and awards the respective player an award as a function as a result of a winning condition for the game played by the respective player and a paytable. Generally, the game control plays the game, randomly establishes an actual outcome of the game, and determines if any of the players have a winning condition.

The shared experience controller 32 is coupled to the game devices, recognizes a win or a winning condition for one of the players and awards an extra award to one or more of the other players. The extra award is a predetermined amount, typically in credits or a monetary value. It is not dependent on, nor contributed to by the wagers made from the players.

In one embodiment, each player game device 12 includes a game controller 14. The shared experience controller 32 may be embodied in a remote or central computer such as the server 16. The shared experience controller 32 may be coupled to the game devices 12 through the network 18. In another embodiment, the game controller 14 and the shared experience controller 32 may be implemented in one or more remote computers or servers 16, which are coupled or networked to the device controller 28 in each game device 12. Those skilled in the art will recognize that other arrangements may also be used.

In one embodiment, the predetermined amount is fixed, randomly determined, or determined in response to input from one or more of the players.

In this manner, the players have a shared positive experience, when one of the players wins, the other players also have a chance of winning an award, i.e., the extra award.

In general, only players currently playing will have a chance to win the extra award.

In one embodiment, the game devices are grouped into subgroups. When one player wins a game on one of the game devices and is given an award, the extra fixed award may be awarded to all of the players playing on game devices within the same subgroup. Alternatively, players playing on games devices in another subgroup may be awarded the extra fixed award.

For example, the game devices 12 may be organized into banks or "zones". The game devices 12 in a particular bank or zones may be of similar type or may be different types of machines. Each bank may constitute a subgroup or a subgroup may be composed of two or more banks.

Alternatively, subgroups may be organized on some other geographic relationship, e.g., a subgroup may be comprised of one game device 12 and one or both of the game devices 12 immediate adjacent on either side.

In a further embodiment, the subgroups of game devices may be organized in a random or apparently random fashion.

In one aspect of the present invention, the organization of the game devices 12 into subgroups may be fixed or predetermined. In another aspect of the present invention, the game devices 12 may be dynamically organized into subgroups. In other words, the game devices 12 are added to a subgroup when a player begins to play the game on the game device 12. The subgroup to which they are added may be dependent upon its location and/or how many players are currently playing, and the number of players currently in the subgroups.

In another aspect of the present invention, the players are alternatively grouped into teams. When one player on a team wins a game and is given an award, the extra fixed award may be awarded to all of the players on the same team. Alternatively, the players on another team may be awarded the extra fixed award.

In one embodiment, the shared experience controller 32 may automatically assign a player to one of the teams as they begin to use a game device 12. Generally, this would be done to even out the teams.

Alternatively, the shared experience controller 32 may prompt the player to pick a team to join. In this manner, players may agree or choose to play on the same team.

In one aspect of the present invention each game device includes a signaling device 30. The signaling device 30 may be one or more of any type of device located on the game device 12, including lights, LEDS or other illuminating device(s) located on or near a game cabinet of the game device 12 or a portion of the display 20. The signaling device 32 may also include one or more speakers. The signaling device 30 may be used to provide a visual and/or audio indication of the winning condition and/or provision of the extra award and/or a bonus award (see below).

Figure 3:
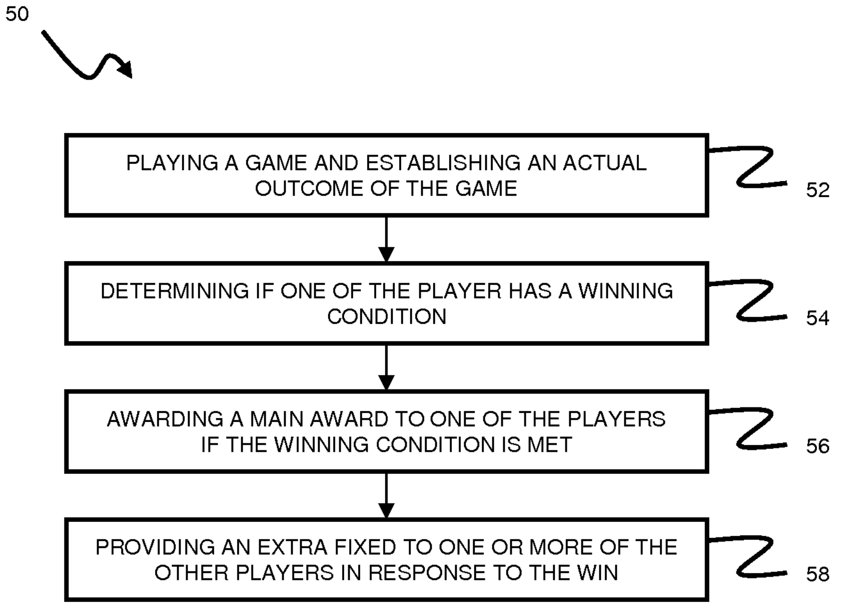
FIG. 3 is a flow diagram of a method for providing a shared win among players of an electronic game, according to an embodiment of the present invention.
Figure 4:
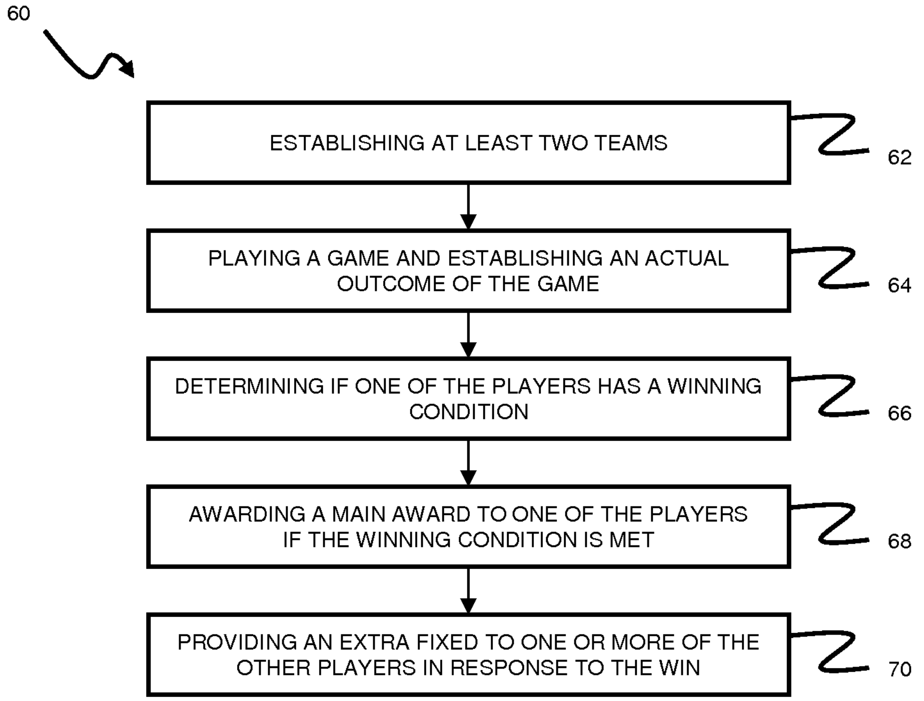
FIG. 4 is a flow diagram of a method for providing a shared win among players of an electronic game, according to another embodiment of the present invention.

With particular reference to FIG. 3, a method 50 for providing a shared experience for players of a plurality of game devices 12 is provided. Each game device 12 allows a player to make a wager on a game. In a first step 52, a game is played and the actual outcome of the game is randomly established. In a second step 54, the actual outcome of the game is used to determine if one of the players has a winning condition as a function of the actual outcome. In a third step 56, a main award is awarded to one of the players if the winning condition is met. In a fourth step 58, the winning condition of one of the players is recognized and the extra award is provided to one or more of the other players.

In still another aspect of the present invention, a method 60 for providing a shared experience for players of a plurality of game devices 12 is provided. Each game device 12 allows a player to make a wager on a game. In a first step 62 at least two teams are established. Each team includes at least two players. In a second step 64, a game is played and an actual outcome of the game is established. In a third step 66, the actual outcome of the game is used to determine if one of the players has a winning condition as a function of the actual outcome. In a fourth step 68, a main award is awarded to the one of the players if the winning condition is met. In a fifth step 70, the winning condition is recognized for one of the players on a first one of the teams and an extra award is responsively provided to the other players on the first one of the teams.

In another aspect of the present invention, the game system 10 provides another way in which excitement in other players due to the play of one player may be generated.

As discussed above, bonus games are known. Bonus games are typically in addition to the main game and provide a bonus award to the players. Bonus games are triggered by a predetermined event in the main, such as the appearance of a designated symbol or pattern on the reels of a slot machine or in a predetermined number or numbers being generated by a random number generator.

Bonus games may be a true game or a pseudo-game. In a true game, the bonus award may be impacted or influenced by input from the player. In a pseudo-game the result of the bonus game, i.e., the amount of the award (if any), is predetermined and any player input only appears to influence the outcome.

In the present invention, when a player triggers a bonus game, the input of other players influences or appears to influence the amount of the award.

In one embodiment, the shared experience controller 32 recognizes a bonus condition for one of the players, responsively provides a choice between at least two items to at least one other player, and provides a bonus award to the one player and/or any of the other players in response to the at least one other player selecting one of the items.

In one embodiment, the bonus award is provided only to the one player. In another embodiment, the bonus award is provided to one or more other players. The one or more other players may be randomly determined, using games devices 12 in the same subgroup, or on the same team. In a third embodiment, the bonus award may be provided to the one player and other players.

For example, if a first player triggers the bonus game, the game controller 14 may send a signal to the shared experience controller 32. In response, the shared experience controller 32 may cause the display 20 of the game device 12 of one or more other players to display a message to those players that the first player has entered the bonus game and solicit their input.

As discussed below, their input may simply be selection of an item or choice from among a plurality of items or choices. The chosen item or choice may be displayed to the first player.

In one embodiment, the amount of the bonus award is randomly established.

In another embodiment, the shared experience controller for randomly establishing the bonus award is determined as a function of the one of the items selected.

As discussed above, in one embodiment the game devices 12 are divided into subgroups. The player who triggers the bonus game and receives the bonus award may be using a game device 12 in a first one of the subgroups. The other player or players who are given the option to select an item or choice may be in the same subgroup or a different subgroup.

In another embodiment, the players are grouped into teams (as described above). This would be independent of which game device 12 they are using. The player who triggers the bonus game and receives the bonus award may be in a first one of the teams. The other player or players who are given the option to select an item or choice may be on the same team or on a different team.

If the choice is presented to two or more other players, their selection is treated as a vote. Which ever choice or selection receives the most vote, that choice or selection is "selected".

In one embodiment, the shared experience controller automatically assigns a player to one of the teams. In another embodiment, the shared experience controller allows a player to elect one of the teams to join.

Figure 5:
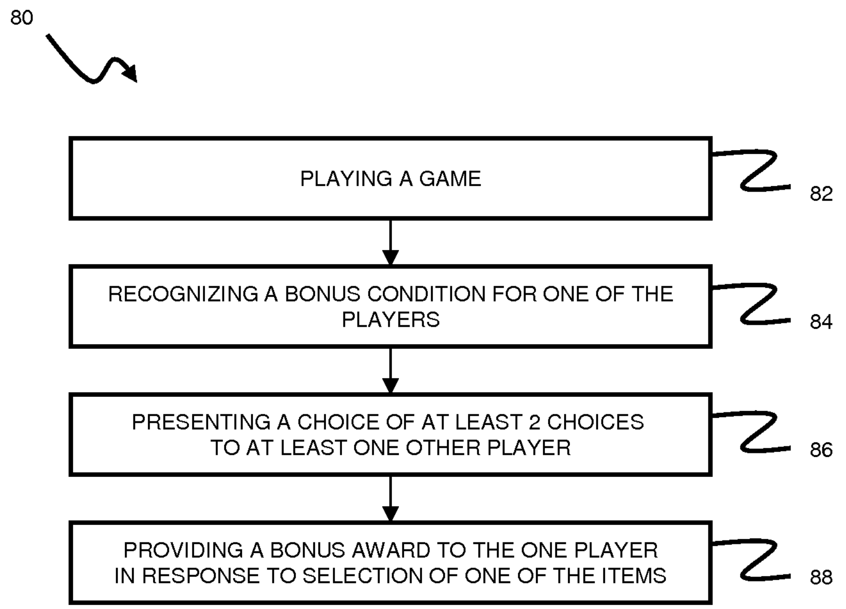
FIG. 5 is a flow diagram of providing a bonus game to a player of an electronic game, according to an embodiment of the present invention.

With reference FIG. 5, in one embodiment a method 80 for providing a shared experience for players of a plurality of game devices 12 is provided. Each game device 12 allows a player to make a wager on a game. In a first step 82, a game is played and a main award is awarded if one of the players has a winning condition. In a second step 84, a bonus condition for one of the players is detected or recognized. In a third step 86, a choice between at least two items is presented to at least one other player. In a fourth step 88, a bonus award is awarded to the one player in response to the at least one other player selecting one of the items.

Figure 6:
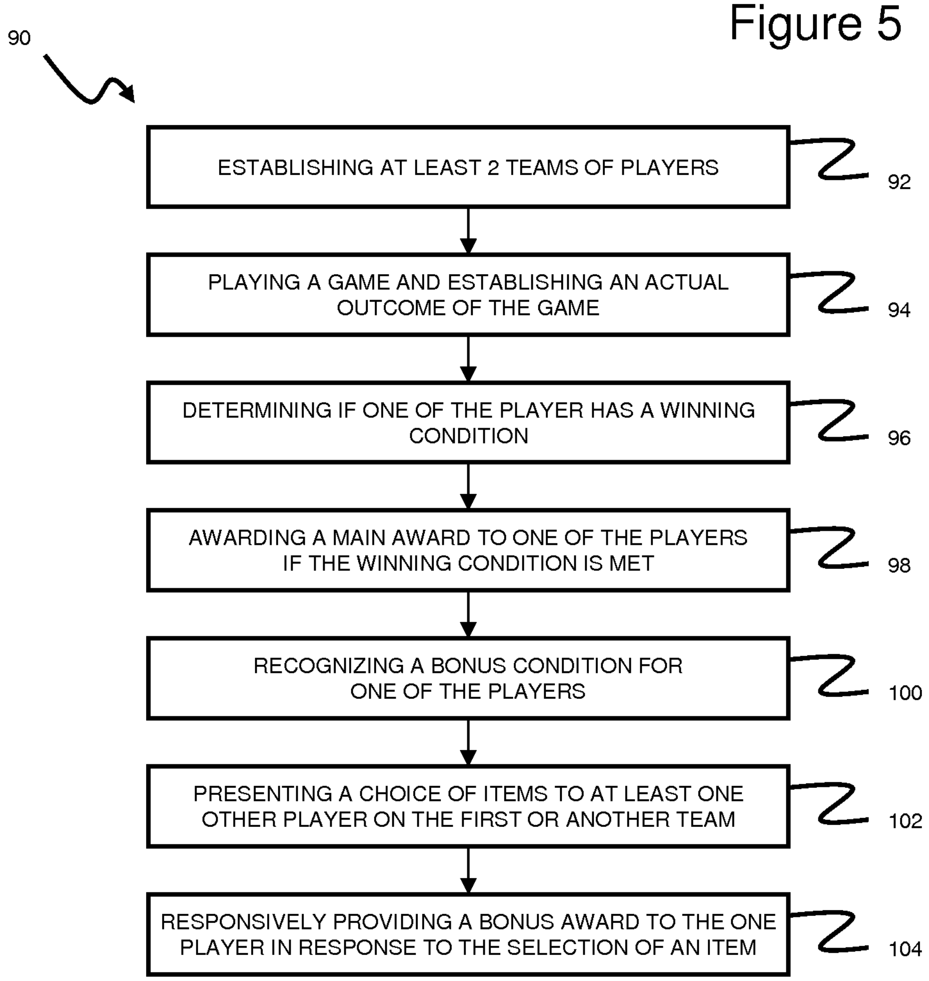
FIG. 6 is a flow diagram of providing a bonus game to a player of an electronic game, according to another embodiment of the present invention.

With reference to FIG. 6, in another embodiment, a method 90 for providing a shared experience for players of a plurality of game devices is provided. Each game device 12 allows a player to make a wager on a game. In a first step 92 at least two teams are established. Each team includes at least two players. In a second step 94, a game is played and an actual outcome of the game is established. In a third step 96, it is determined if one of the players has a winning condition as a function of the actual outcome. In a fourth step 98, a main award is awarded to the one of the players if the winning condition is met. In a fifth step 100, a bonus condition for one of the players is recognized. In a sixth step 102, a choice of items or selections is presented to at least one other player on the first or another team. In a seventh step 104, the bonus award is provided to the one player in response to selection of the item.

Figure 7:
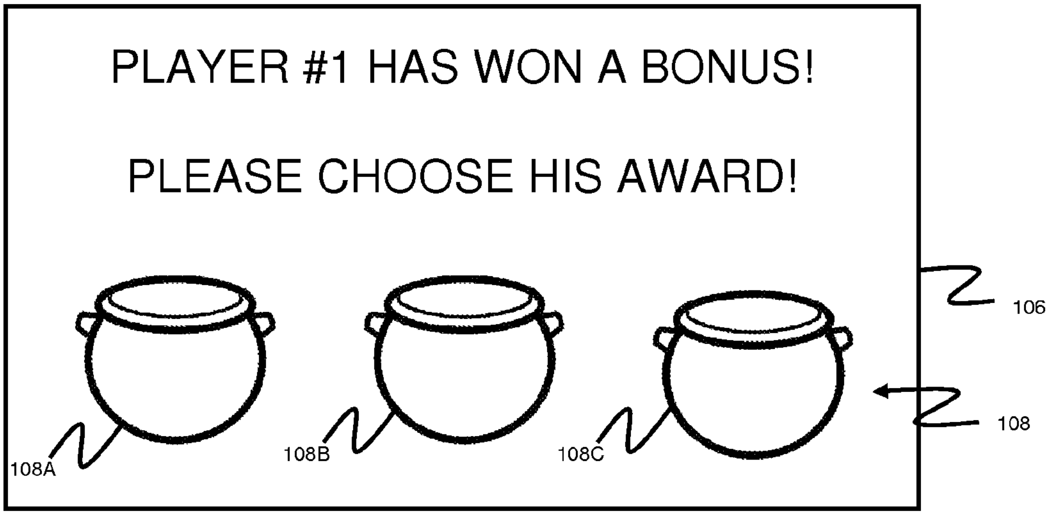
FIG. 7 is a diagrammatic illustration of a screen of a user interface in providing a bonus game to a player, according to an embodiment of the present invention.
Figure 8:
FIG. 8 is a second diagrammatic illustration of a screen of a user interface in providing a bonus game to a player, according to an embodiment of the present invention.

With reference to FIGS. 7 and 8 diagrammatic illustrations of sample screen shots are shown. In a first screen shot 106, a plurality of choices or items 108 are displayed to the other player or players. The screen shot 106 may include an appropriate message instructing the player or players what is occurring. In the illustrated embodiment, three choices or items 108A, 108B, 108C, are shown. After the player or players have chosen or made a selection, the bonus award is made to the first player who triggered the bonus game. In the second screen shot 110, the selected item 112 along with the amount of their bonus award may be displayed.

It will, of course, be understood that the foregoing description is of a preferred exemplary embodiment of the invention and that the invention is not limited to the specific embodiments shown. Other changes and modifications will become apparent to those skilled in the art and all such changes and modifications are intended to be within the scope of the present invention.

The invention claimed is:

1. A gaming system, comprising:

a plurality of game devices, each game device for allowing a player to make a wager on a game and for awarding the respective player an award as a function as a result of a winning condition for the game played by the respective player;

a game controller coupled to the game devices for playing the game, randomly establishing the actual outcome of the game, and determining if of the players has a winning condition;

a shared experience controller coupled to the game devices for recognizing a bonus condition for one of the players, responsively providing a choice between at least two items to at least one other player, and providing a bonus award to the one player in response to the at least one other player selecting one of the items, where the one player is not provided with the choice between the at least two items.

2. A gaming system, as set forth in claim 1, wherein the shared experience controller randomly establishes the bonus award.

3. A gaming system, as set forth in claim 1, wherein the shared experience controller establishes the bonus award as a function of the one of the items selected.

4. A gaming system, as set forth in claim 1, wherein the game controller receives the one of the items selected from the shared experience controllers and displays the selected one of the items to the one of the players.

5. A gaming system, as set forth in claim 1, wherein the plurality of game devices are grouped into subgroups, wherein the at least one other player is using a game device from the same subgroup.

6. A gaming system, as set forth in claim 1, wherein the plurality of game devices are grouped into subgroups, wherein the at least one other player is using a game device from the different subgroup as the one player.

7. A gaming system, as set forth in claim 1, wherein the players are grouped into teams, wherein the at least one other player is from the same team as the one player.

8. A gaming system, as set forth in claim 1, wherein the players are grouped into teams, wherein the at least one other player is from a different team as the one player.

9. A gaming system, as set forth in claim 1, wherein each game device includes a gaming controller.

10. A gaming system, as set forth in claim 1, wherein each game device includes a device controller, the game controller being located at a central location and coupled to each device controller, the device controller for controlling operation of the respective game device and for managing communications between the respective game device and the game controller.

11. A gaming system, as set forth in claim 1, wherein the game is a bingo game.

12. A gaming system, as set forth in claim 1, wherein each game device includes a signaling device for providing a visual indication of the bonus condition and/or provision of the bonus award.

13. A gaming system, as set forth in claim 1, wherein the shared experience controller providing the choice between at least two items to two or more players and selects one of the items as the item selected by more players.

14. A gaming system, as set forth in claim 1, wherein the bonus award is also awarded to the other players.

15. A method for providing a shared experience for players of a plurality of game devices, each game device for allowing a player to make a wager on a game, the method comprising the steps of:

playing a game and awarding a main award if one of the players has a winning condition;

recognizing a bonus condition for one of the players;

presenting a choice between at least two items to at least one other player;

providing a bonus award to the one player in response to the at least one other player selecting one of the items, wherein the one player is not provided with the choice between the at least two items.

16. A method, as set forth in claim 15, wherein the bonus award is randomly established.

17. A method, as set forth in claim 15, wherein the bonus award is established as a function of the one of the items selected.

18. A method, as set forth in claims 15, including the step of displaying to the one player the selected one of the items.

19. A method, as set forth in claim 15, wherein the plurality of game devices are grouped into subgroups, wherein the at least one other player is using a game device from the same subgroup.

20. A method, as set forth in claim 15, wherein the plurality of game devices are grouped into subgroups, wherein the at least one other player is using a game device from a different subgroup.

21. A method, as set forth in claim 15, wherein the players are grouped into teams, wherein the at least one other player is on the same team as the one player.

22. A method, as set forth in claim 15, wherein the players are grouped into teams, wherein the at least one other player is on a different team as the one player.

23. A method, as set forth in claim 15, wherein the step of presenting a choice between at least two items to at least one other player includes the step of presenting the choice to at least two choices and the method includes the step of selecting one of the items as the item selected by more players.

24. A method, as set forth in claim 15, wherein the bonus award is also awarded to the other players.

25. A gaming system for a plurality of players, comprising:

a plurality of game devices for allowing the players to make a wager on a game;

a game controller coupled to the game devices for playing the game, randomly establishing the actual outcome of the game, determining if any of the players have a winning condition, and for awarding the respective player an award as a function as a result of a winning condition for the game played by the respective player;

a shared experience controller coupled to the game devices for establishing for at least two teams, each team including at least two players and for recognizing a bonus condition for one of the players on a first one of the teams, presenting a choice of items to at least one other player on the first team or another team, and responsively providing a bonus award to the one player in response to the at least one other player making a selection between the items, where the one player is not provided with the choice between the at least two items.

26. A gaming system, as set forth in claim 25, the shared experience controller for automatically assigning a player to one of the teams.

27. A gaming system, as set forth in claim 25, the shared experience controller for allowing a player to elect one of the teams to join.

28. A gaming system, as set forth in claim 25, wherein the bonus award is also awarded to the other players.

29. A method for providing a shared experience for players of a plurality of game devices, each game device for allowing a player to make a wager on a game, the method comprising the steps of:

establishing at least two teams, each team including at least two players;

playing a game and establishing an actual outcome of the game;

determining if one of the players has a winning condition as a function of the actual outcome;

awarding a main award to the one of the players if the winning condition is met;

recognizing a bonus condition for one of the players on a first one of the teams;

presenting a choice of items to at least one other player on the first team or another team; and, responsively providing a bonus award to the one player in response to the at least one other player making a selection between the items, where the one player is not provided with the choice between the at least two items.

30. A method, as set forth in claim 29, wherein the step of establishing at least two teams includes the step of automatically assigning a player to one of the teams.

31. A method, as set forth in claim 29, wherein the step of establishing at least two teams includes the step of allowing a player to elect one of the teams to join.

32. A method, as set forth in claim 29, wherein the bonus award is also awarded to the other players.

* * * * *

UNITED STATES PATENT AND TRADEMARK OFFICE

CERTIFICATE OF CORRECTION

PATENT NO. : 8,535,156 B2
APPLICATION NO. : 11/277094
DATED : September 17, 2013
INVENTOR(S) : Alan Roireau It is certified that error appears in the above-identified patent and that said Letters Patent is hereby corrected as shown below:

In the Claims:

Column 10, line 59: Please delete "for establishing for at least" and replace with -- for establishing at least. --

Signed and Sealed this
Twenty-fifth Day of February, 2014

Michelle K. Lee
*Deputy Director of the United States Patent and Trademark Office*